PHOTOGRAPHIC APPARATUS

Original Filed June 4, 1958 4 Sheets-Sheet 1

INVENTORS
Joseph H. Booth
and
BY Lewis H. Chubb, Jr.
Brown and Mikulka
ATTORNEYS

PHOTOGRAPHIC APPARATUS

Original Filed June 4, 1958 4 Sheets-Sheet 2

INVENTORS
Joseph H. Booth
and
Lewis H. Chubb, Jr.
BY Brown and Mikulka
ATTORNEYS

PHOTOGRAPHIC APPARATUS

Original Filed June 4, 1958 4 Sheets-Sheet 3

INVENTORS
Joseph H. Booth
and
BY Lewis N. Clubb, Jr.
Brown and Mikulka
ATTORNEYS May 8, 1962 J. H. BOOTH ETAL Re. 25,167
PHOTOGRAPHIC APPARATUS
Original Filed June 4, 1958 4 Sheets-Sheet 4
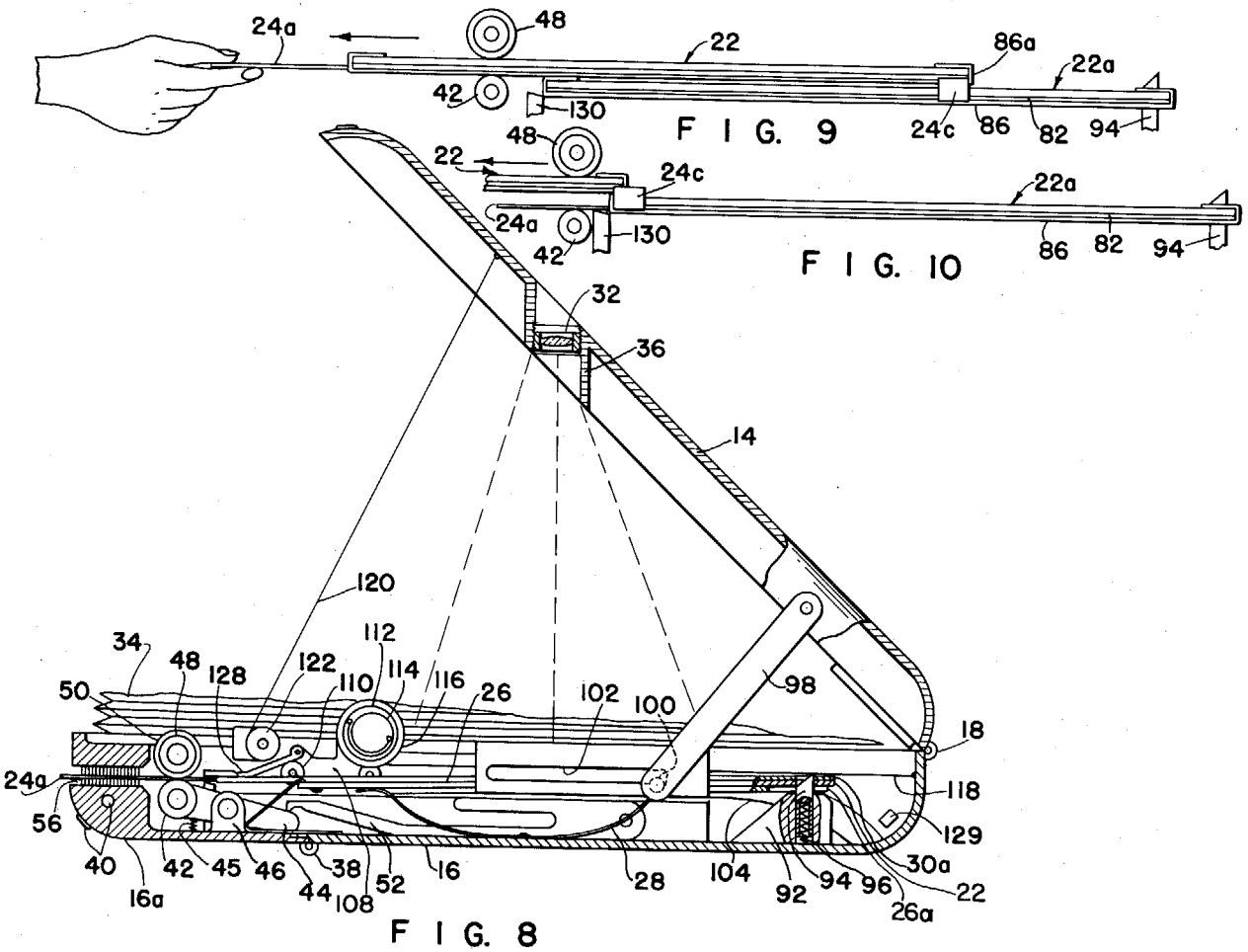
INVENTORS
Joseph H. Booth
and
Lewis H. Chubb, Jr.
BY
Brown and Mikulka
ATTORNEYS United States Patent Office Re. 25,167
Reissued May 8, 1962

25,167
PHOTOGRAPHIC APPARATUS

Joseph H. Booth, Belmont, and Lewis W. Chubb, Jr., Sharon, Mass., assignors to Polaroid Corporation, Cambridge, Mass., a corporation of Delaware Original No. 2,906,182, dated Sept. 29, 1959, Ser. No. 739,924, June 4, 1958. Application for reissue Sept. 27, 1960, Ser. No. 58,869
30 Claims. (Cl. 95—13)

Matter enclosed in heavy brackets [ ] appears in the original patent but forms no part of this reissue specification; matter printed in italics indicates the additions made by reissue.

This invention relates to photographic apparatus and, more particularly, to a self-processing camera wherein a covering layer of a composite film is removed from a photosensitive layer preparatory to exposure of the latter and is then returned to a covering position, after which the film is processed to provide a positive print in the covering layer.

Objects of the invention are to provide camera apparatus for use with a cut film unit of a novel type comprising a photosensitive layer, a frontal partially removable covering layer and means containing a processing fluid for release between the photosensitive and covering layers; to provide a camera for use with a film unit of the character described wherein the photosensitive layer is positioned in a focal plane for exposure, the frontal covering layer is rolled or wound away from the photosensitive layer, the photosensitive layer is exposed, the covering layer is unwound to its covering position, and the entire film unit is then withdrawn from the camera between pressure-applying means so that the processing fluid is spread between the photosensitive and covering layers and a positive print is formed in the latter by a diffusion transfer reversal operation.

Other objects of the invention are to provide camera apparatus of the character described wherein a plurality of the cut film units are contained in a magazine, the latter being adapted to loading and insertion into the camera in an environment of actinic light; to provide film units of a type which can be removed or interchanged with others in the presence of actinic light without danger of exposure, thus permitting, for example, the intermixing of black-and-white and color films at will.

Other objects are to provide film units and a magazine having mechanical features which complement those of the camera in the removal and return of the covering layer; in providing the proper individual withdrawal of each film unit from the camera; in the sequential positioning of the film units for photographic exposure; in the successive positioning, during the withdrawal of one film unit, of a draw-tab of the following film unit to a location externally of the camera where it can be grasped manually; and in the spreading of the processing fluid evenly between the photosensitive and covering layers during removal of the film unit from the camera.

Other objects of the invention are to provide a camera of the character described in which an extremity of the covering layer is picked up by a driven, translationally and rotationally moving reel or spool and the layer is then wound upon the reel while the latter is moved across a face of the unit to a position immediately to one side of the image area whereby photographic exposure of the photosensitive layer can be performed; to provide a camera of a folding type in which the operation of opening and closing the bellows provides, through a mechanical linkage, the aforesaid rotational and translational movement of the pickup spool, thus placing the film unit, first, in a condition for the photographic exposure and, second, in a condition for processing; to provide film units which, after the covering layer has been returned to its overlying position and the processing fluid has been spread, are completely lighttight so that processing can be completed externally of the camera if desired, thus permitting the taking of pictures in rapid succession rather than having to wait for the processing of one film before the next can be exposed and processed; and to provide a camera of the character described which is of relatively simple, tamper-proof and trouble-free construction, light in weight, thin and compact, having features which enable improved ease in use and greater convenience of carrying in comparison to other self-processing cameras.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 8 is a diagrammatic view of the camera of FIG. 1 with the front section opened for picture taking and illustrates the relative position of the camera and film elements during the making of a photographic exposure;

FIGS. 9 and 10 are diagrammatic side views illustrating the movements involved in processing and removal of a front-lying film unit after its exposure and the effect of its removal upon an underlying film unit;

The camera and film components of the present invention are related to a diffusion transfer reversal method of forming photographic prints.

In its preferred embodiment, the camera of the present invention is of a folding type having a pivotal front section or chamber containing a lens and shutter and a rear section in which the film-holding and positioning means, the film processing means, the elements for manipulating the film covering layer, and the elements for holding a photosensitive layer at a focal plane are located. The front and rear sections and the bellows form a lighttight chamber therewithin. The bellows connects the front and rear sections of the camera in such a manner that when the camera is ready to take a picture, with the bellows extended, the front section has been pivoted away from the rear section at an angle of approximately 45°. The camera objective is so mounted in the front section, at an acute angle with respect to the principal plane thereof, that when the front section is positioned at the aforesaid angle of 45° with respect to the rear section, the optical axis of the lens is normal to the focal plane and centered with respect to the image area, as indicated by the broken lines in FIG. 8.

The film is a novel type of cut film especially adapted to use with the camera and is supplied in the form of a film pack composed of several film units, the film pack being loaded into the camera from a magazine. The magazine is shown in detail in FIG. 2. Each film unit comprises a photosensitive layer of a convenient size, i.e., 2⅝ × 3½ inches, and of a type adapted to use in a black-and-white or a color process, as the case may be, interposed between an opaque backing layer and an opaque frontal covering layer. The covering layer is releasably held attached to the backing layer along its longitudinal edges and is adapted to be coiled away in part from the photosensitive layer and wound upon a reel or spool which is undergoing both rotation and translational movement. Removal of the covering layer portion permits the subsequent photographic exposure of the photosensitive emulsion. A processing fluid or reagent adapted to the diffusion transfer reversal operation of print formation is confined within a compressible container mounted between the photosensitive layer and the frontal covering layer, at one side of the area in which the image is to be formed. The fluid is released under applied compression between separated surfaces of the container and is spread between the photosensitive layer and the frontal covering layer while the exposed film unit is being withdrawn from the camera. The inner surface or coating of the frontal covering layer, or of a thin flexible sheet attached to the covering layer, is employed for carrying the positive print which is produced by the transfer thereto from the photosensitive layer of the image-forming components.

Figure 1:
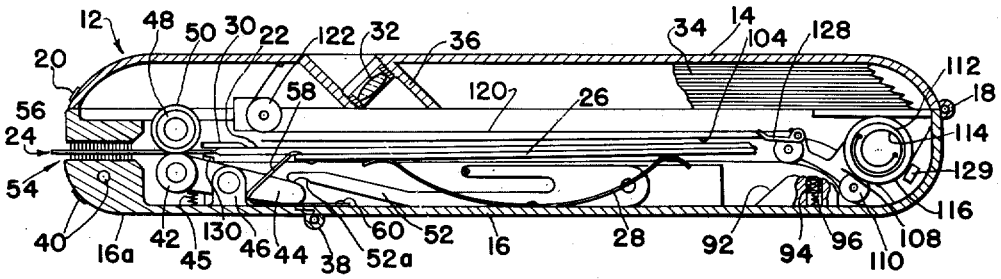
FIGURE 1 is a diagrammatic view, partly in section and with parts broken away, of a camera component of the invention, the camera being held for taking a horizontal picture and viewed from the top at closed position.

Referring to FIG. 1, a diagrammatic representation of the camera 12 of the invention is shown in the closed or carrying condition, as it would appear looking downwardly upon it in horizontal picture-taking position with the casing broken away. The casing is preferably formed, at least in part, of aluminum or another suitable metal. The front section 14 of the camera is pivotally attached to the rear section 16 by a hinge 18 and a latch 20, the front section being pivotally opened to its fullest extent prior to taking a picture, said extent preferably being to an angle of approximately 45° for reasons which will appear below. Certain equipment relating to performance of the photographic exposure is not included, it being understood that a suitable diaphragm, shutter and lens-adjusting means (not shown) are included and that the camera may also incorporate viewfinder, rangefinder, lightmeter and flash elements. The terms "front" and "rear" are used herein, relative both to the camera and to the film constructions, as designating those elements which are respectively located, nearest to and most remote from the subject of the photographic exposure, with the camera and film held in a position for picture taking.

A cut film unit 22, shown in part only and comprising a draw-tab 24, is mounted in the rear section, its position substantially in the focal plane of the camera being provided, respectively, by a movable pressure plate 26, biased forwardly by leaf spring 28 and bearing against the back of the film unit, and by the front marginal areas of the fixed film-positioning frame 30 against which the film unit is pressed. The front section 14 of the camera serves to house objective 32 and, at the closed position shown, to enclose the retracted bellows 34. Lens 32 is mounted in a lens tube 36, the latter being disposed at an oblique angle relative to the plane of the front section so that when the front section is opened for picture taking, the optical axis of the lens is properly positioned at 90° to the focal plane.

The rear camera section 16 includes a pivotally mounted subsection 16a which is opened to insert the magazine into the camera during loading of the film pack or to provide access to the area adjacent to the pressure-applying means, for cleaning or for any other purpose.

Subsection 16a is mounted on section 16 by a hinge 38 and is held at its closed position by a latch 40. Located within the subsection is a pressure roll 42, rotatably mounted at either end on an individual pivotal arm 44 as, for example, by ball bearings. Each arm 44 is pivotally mounted on a supporting stud or bracket 46. A second pressure roll 48, having a shoulder or bead 50 of a given height extending around its periphery adjacent to each extremity, is mounted for rotation in fixed side portions of section 16 by ball bearings. Each of the arms 44 is so biased by a leaf spring 52 bearing on an extremity thereof that pressure roll 42 is urged forwardly into contact with the beads 50 of pressure roll 48. With the pressure roll surfaces thus in contact with one another, a given small spacing is provided between their pressure-applying surfaces as determined by the thickness of the beads 50, said spacing, in conjunction with the compressive force of springs 52, controlling the degree of compression applied to the film unit when the latter, after its exposure, is drawn between the rolls. The spacing of the pressure rolls is carefully calculated with respect to the structure of the film unit so that the first appreciable resistance encountered in withdrawing the film unit is due to contact of the raised beads with film portions adjacent the fluid container. It will be noted that the extremities of springs 52 have concavities 52a into which the rounded ends of the arms 44 are adapted to slide and to turn without hindrance when subsection 16a is swung open. When subsection 16a is opened, the proper position of arms 44 is maintained by a pair of springs 45 (one shown).

With subsection 16a at closed position, a slot or exit aperture 54 is provided between the subsection and the rear section 16 for withdrawal of each film unit, the inner face of the slot being provided with light-seal means 56 such as a strip of mohair extending across each facing surface of the slot. Subsection 16a also includes a pair of flexible, V-shaped metallic ramps 58 positioned transversely of the rear section and attached fixedly to the rear wall of said section, as by rivets 60. The ramps 58 are pivotally attached at their other ends to that extremity of pressure plate 26 which is first contacted by the magazine during its insertion into the camera. The V of the ramps, in response to the progressive contact of the magazine with the pressure plate, during insertion of the magazine, is narrowed. Pressure plate 26 is thus moved rearwardly, in opposition to the bias applied thereto by spring 28, to an extent which permits the magazine to be inserted in the camera to its full length between the pressure plate and the marginal areas which constitute the film-positioning frame 30.

Figure 2:
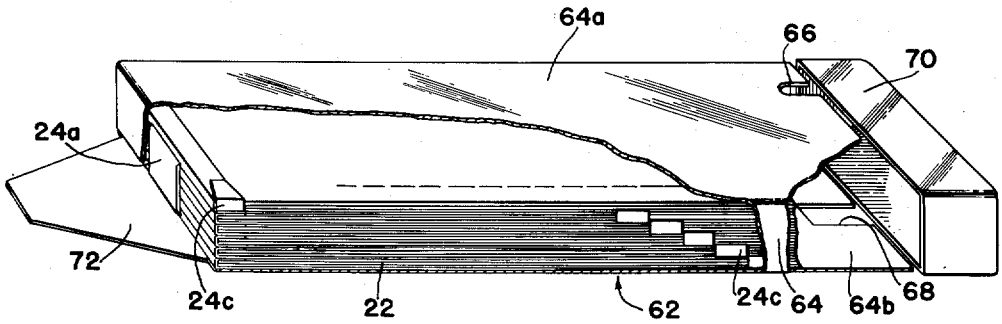
FIG. 2 is a diagrammatic perspective view, with parts broken away, of a magazine adapted to be used in the camera of FIG. 1 and containing a plurality of film units.

The magazine 62, illustrated in FIG. 2, releasably contains a plurality of the film units 22 and provides a convenient and protective means for packaging the film units during storage or shipment in addition to the function which it serves during loading of the film pack into the camera. The thickness of the film units and of the magazine is exaggerated in the illustration to more clearly show their construction. Magazine 62 includes a light-tight casing 64 constructed of a preferably moderately rigid material such as cardboard or the like, having a pair of small slots 66 formed in the leading edge of the front wall 64a and a pair of relatively larger slots 68 formed in the leading edge of the rear wall 64b. Front wall 64a is that which is positioned forwardly in the camera, in slidable contact with film-positioning frame 30 during the loading operation. The purpose of the slots 66 and 68 is to permit unrestricted engagement of retaining means of the camera with the film units contained in the magazine, during and after removal of the magazine, and will be explained below following a more detailed description of the film units. Closure means in the form of a light-sealing protective cap 70 or the like is provided for the open end of the magazine in which are formed the slots 66 and 68. The cap fits tightly over the magazine and may also appropriately be constructed of cardboard. The cap is held mounted on the body of the magazine by a strip of removable tape (not shown) or a tape, only, may be used to close the open end of the magazine. Cap 70 is removed before the magazine is inserted into the camera. A pull-tab 72 at the opposite end of the magazine is employed for removing the magazine from the camera after loading the film pack, the tab protruding slightly beyond the camera aperture 54 so that it can be grasped, manually, and the magazine withdrawn.

Figure 3:
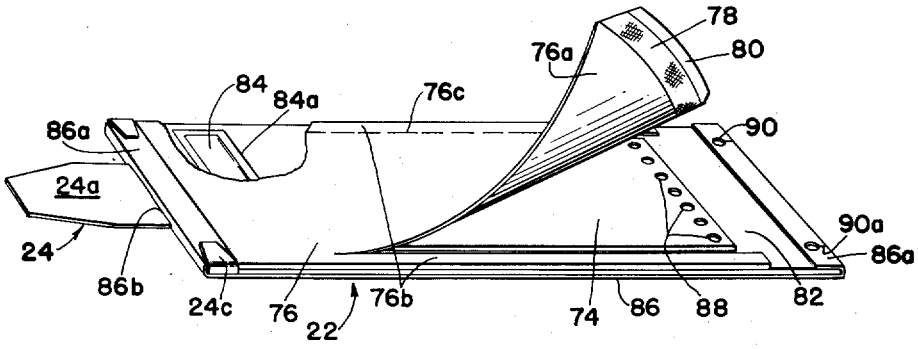
FIG. 3 is a diagrammatic perspective view illustrating an individual film unit.

The film units 22 constituting a film pack are stacked in overlying relation to one another in the magazine. A magazine of convenient size could hold six of the film units, as shown, the capacity depending upon selected camera dimensions. To understand the sequential positioning of the film units in the camera in a plane for exposure and processing, it is necessary to consider the structure of an individual film unit, which is shown in detail in FIG. 3. The film unit includes a photosensitive layer 74 composed, for example, of a paper or a cellulosic material having an emulsion comprising a silver halide formed thereon, and a frontal or covering layer 76, the major covering area 76a of which is releasably attached to edge portions 76b thereof, as by semi-perforations 76c, so that the area 76a can be rolled or coiled from its covering position overlying photosensitive layer 74 and taken up by mechanical means suitable for the purpose. Frontal layer 76 is to be employed ultimately for carrying a positive print and can either be a single opaque sheet or of a composite type composed of a transparent layer and an opaque layer, said layers being relatively separable after formation of the print. The composite type permits the print to be in the form of a transparency by forming the image on the transparent layer and removing the opaque layer. A flexible endpiece 78 formed, for example, of a cloth material, is attached to an extremity of the covering area 76a and a metallic strip 80, i.e., a thin strip of iron, adapted to magnetic attraction, is bonded to the endpiece 78 adjacent its extremity. An opaque base or backing layer 82 is located behind photosensitive layer 74. The underside of the marginal portions 76b is bonded to the facing surface of backing layer 82 and, also, the narrow transverse areas of layers 76 and 82 which face one another at the extremity of the unit adjacent to draw-tab 24 are preferably bonded together. The inner surface of covering layer 76a comprises a coating formed of relatively inert materials suitable for precipitating silver thereon, the coating being formed directly on layer 76a or on a thin sheet, such as a sheet of baryta paper, which has previously been bonded to layer 76a. A fluid container 84, of a type generally known with respect to a self-processing film of the subject category, having flexible walls and separable edges 84a, is positioned between frontal layer 76 and backing layer 82 at a location which is immediately contiguous one end of the designated image area, the container being attached to one of said layers to maintain its proper position and preferably being bonded to the backing layer 82. An extremity of photosensitive layer 74 terminates immediately adjacent the edges 84a of the fluid container 84 which are releasably bonded together and which, when separated, constitute an orifice between which the processing fluid is adapted to be emitted when the container is subjected to compression, as by pressure rolls 42 and 48 of the camera. Photosensitive layer 74 is bonded to backing layer 82 preferably along only a narrow transverse strip at that end which is adjacent the fluid container 84. The processing fluid is preferably somewhat viscous and is suitable for spreading between photosensitive layer 74 and covering layer 76a. The composition of one form of processing fluid suitable for the purpose includes a developer, an alkali for permitting the developer to function properly, a solvent for forming a suitable complex with a silver halide, and a film-forming material.

Figure 4:
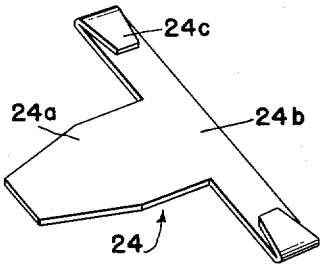
FIG. 4 is a perspective view of the draw-tab element of a film unit.

A thin layer 86, preferably formed of paper and coextensive with, but unbonded to, the rear surface of backing layer 82, is held in position by having its end portions 86a folded over each end of layer 82, the folded-over portions 86a, only, being bonded to the front surface of layer 82. This construction permits a slight spacing between layers 82 and 86 extending throughout the entire length of the assembly and between which a crosspiece 24b of draw-tab 24 is permitted to be slidably moved longitudinally of the film unit for a reason presently to be described. The construction of the draw-tab 24 is shown in further detail in FIG. 4 and includes the outwardly extending portion 24a, the crosspiece portion 24b and the overturned ears 24c. With the draw-tab mounted so as to constitute a part of the film unit 22, the crosspiece 24b extends transversely across and between layers 82 and 86 and the ears 24c are folded around the transverse edges of layer 82 in the manner shown so as to be substantially parallel with the outer or front surface of covering layer 76. Portion 24a of the draw-tab is adapted to pass through a slot 86b formed in one of the overturned end portions 86a of the paper sheet 86 so as to protrude therethrough. The portion 24a is that which is manually grasped for withdrawing a film unit from the camera. As shown in FIG. 2, when the film units are mounted in the magazine, i.e., as supplied, one draw-tab 24 is positioned at an end of one film unit, the portion 24a being folded over in the manner illustrated for compact packaging. Draw-tabs of the remaining units are arranged in staggered relation, only the ear portions 24c being visible.

The overturned ears 24c of the draw-tab of the rearmost film unit are inserted between the layers 86 and 82 of the next forward film unit, the same arrangement of draw-tabs and layers existing between the other film units of the film pack. Operation of the draw-tabs will be further described, below.

To complete the description of the film unit 22, it also includes a plurality of transversely disposed perforations 88 formed in layer 74 adjacent an extremity thereof. Perforations 88 serve as traps for preventing the escape of any of the processing fluid which may be present after spreading of the fluid between the facing surfaces of layers 74 and 76 during compression of the unit. The fabric of pickup-tab 78 is preferably of an absorptive type which can also be employed as a supplemental means for trapping any excess of the fluid. A pair of perforations 90, having separable slots 90a leading thereinto, are formed so as to extend completely through layers 86a, 82 and 86 of the unit, the purpose of said slots and perforations being described below.

Again referring to FIGS. 1 and 2, the procedure for inserting the magazine 62 in the camera and thereby loading the film pack is as follows. Cover 70 is removed from the magazine. The latch 40 of the camera is released and subsection 16a is swung to open position, thus separating the rear pressure roll 42 from contact with the front pressure roll 48. The leading edges of the magazine containing the slots 66 and 68 are simultaneously brought into contact with the fixed film-positioning frame 30 and the flexible ramps 58. Ramps 58 are flexed rearwardly and permit the magazine to be slid between the frame 30 and the yielding pressure plate 26.

Figure 6:
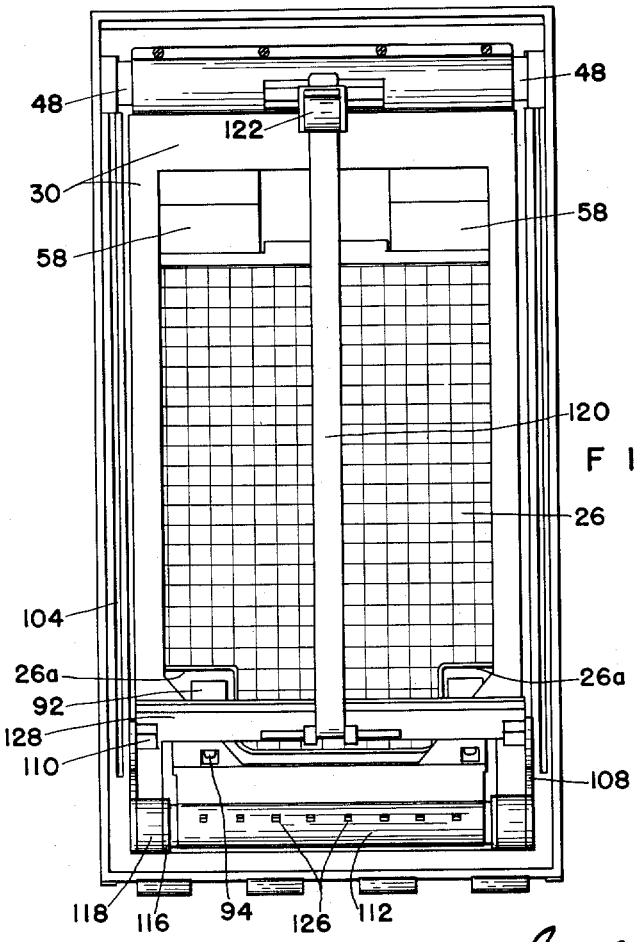
FIGS. 6 and 7 are diagrammatic views of the interior of the camera, taken from the front and looking inward with the bellows and lens removed.
Figure 7:
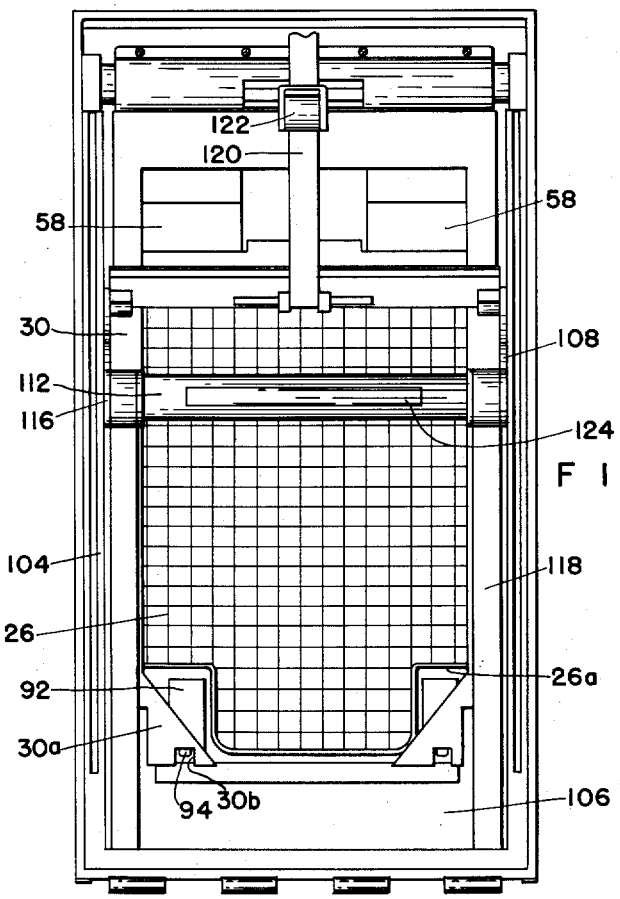

As shown in greater detail in FIGS. 6, 7 and 8, two laterally-spaced guides or ramps 92 are mounted in the rear section 16 of the camera. They serve as guides to properly position the leading portions of the film pack during the loading operation. An individual detent pin 94, biased forwardly by a spring 96, extends through a slot formed in each of ramps 92 and protrudes forwardly beyond the surface of a given ramp by an amount slightly exceeding the thickness of the film pack. As shown in FIGS. 6 and 7, pressure plate 26 is provided with cutout portions 26a which permit free movements of the pressure plate, unimpeded by ramps 92. It will also be noted that film-positioning frame 30 comprises diagonally extending end portions 30a having slots 30b, the latter permitting the tips of pins 94 to extend freely beyond the film pack.

Slots 68 of the magazine prevent interception of the leading edge of rear wall 64b by ramps 92 and allow the magazine to be inserted to the proper depth in the camera. The distance to which the magazine is inserted is that which enables the detent pins 94 to enter the perforations 90 of the film units, the film pack composed of said units then being approximately positioned and retained in the camera. Slots 66 of the magazine are provided to permit the tips of pins 94 to extend slightly beyond the front film unit. After the film pack has been positioned in the camera, as above described, the magazine can be slidably withdrawn with ease, tab 72 being manually grasped and pulled upon for the purpose. After removal of the magazine, the film pack is established at its final correct position in the camera, the marginal area 76b being in firm contact with the inner surfaces of film-retaining frame 30, as provided by the urging of the film pack forwardly by pressure plate 26.

After the film pack has been loaded, subsection 16a is closed. The front film unit 22 is then at proper position for the photographic exposure. It will be understood that at this stage the covering layer 76 is lying flat upon the photosensitive layer 74, there having occurred no separation as yet of portion 76a from 76b along semi-perforations 76c. It will be noted that draw-tab 24 of the front film unit 22 extends through aperture 54 exteriorly of the camera to an extent which is sufficient for its being grasped manually and drawn upon to process the film unit and remove it from the camera after the photographic exposure.

Means for photographically exposing each film unit will now be considered. Latch 20 is released and front section 14 is pivoted on hinge 18 to its maximum open position which, as previously mentioned and as shown in FIG. 8, is at an angle of approximately 45° relative to the rear section. The front section 14 is releasably held at this position by a pair of support arms 98, each comprising a pin 100, the latter being slidably mounted in an individual slot 102 at opposite sides of the camera section 16. With front section 14 at the open position, bellows 34 is fully extended and lens 32 is in correct position for taking the picture.

The front film unit 22 is prepared for exposure by temporarily removing covering layer 76 from photosensitive layer 74 while the film unit is mounted in the camera. The structure of the film unit which is particularly adapted to such a purpose has previously been described. Elements of the camera especially cooperating with the covering layer of the film unit to effect its temporary removal are provided. A pair of tracks 104 extends generally longitudinally along each side wall of the rear section 16 and curves rearwardly into a well 106 located in the rear section adjacent the hinged end thereof. A movable carriage 108 comprises a rigid frame extending transversely across rear section 16 and having a pair of guide rollers 110 at each end. Each pair of guide rollers is located within, and is adapted to rotatably ride along, one of said pair of tracks 104 so that the carriage is guided in its movement longitudinally back and forth in the section and is caused to be positioned rearwardly in well 106 at the beginning and at the conclusion of one complete cycle of its course of travel. This construction, which permits the carriage and elements mounted thereon to be retracted, enables a reduction in the overall thickness of the camera.

A pickup spool 112 is rotatably mounted between two projecting endpieces of the carriage so as to extend transversely across the camera section. When the spool is in functional position with respect to a film unit, the periphery of the spool is spaced from covering layer 76 of the film unit to an extent sufficient to permit said layer to be readily coiled on the spool. The spool has an internal torsion spring 114 and a separate takeup pulley or reel 116 attached to the spool at each each of the latter so as to turn therewith. An individual thin flexible traction tape 118 is fixedly attached to each of the pulleys and to the wall of section 16 which lies adjacent hinge 18. Movement of the carriage longitudinally away from well 106 unwinds the traction tapes from the pulleys 116, causes the spool 112 to rotate and tensions the torsion spring 114. It is to be noted that tapes 118 are completely wound upon the pulleys 116 at the condition of the mechanism shown in FIGS. 1 and 6. The tapes are shown partially unwound in FIG. 7. They are shown completely unwound and the torsion spring tension to its maximum in FIG. 8.

Translational movement of the carriage 108, and more particularly of spool 112, longitudinally of section 16 and across the film unit 22 is accomplished as follows. A flexible steel tape 120 is attached, respectively, to carriage 108 and to the inside front wall of front section 14. The tape 120 passes around a guide pulley 122 which is mounted for rotation on rear section 16. When the front section 14 of the camera is opened, preparatory to the photographic exposure, as shown in FIG. 8, the flexible tape 120 is drawn forwardly therewith and provides translational movement of the carriage and spool in a plane parallel to that of the mounted film unit in accordance with the guidance of the carriage provided by tracks 104 and guide rollers 110. During this movement, tapes 118 also serve to maintain the axis of spool 112 extending transversely across the film unit in proper position.

Figure 5:
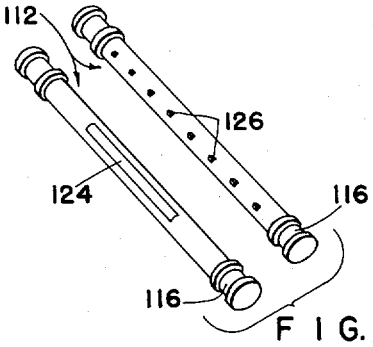
FIG. 5 is a diagrammatic perspective view of the pickup spool element of the camera of FIG. 1.

As shown in FIG. 5, the pickup spool 112 comprises a bar magnet 124, formed, for example, of the alloy "Alnico," product of the Aluminum Company of America, inset in its periphery. Elsewhere on this spool are located a plurality of needle-like protruding pins or prongs 126 which extend outwardly from the spool surface and are arranged preferably in a line longitudinally thereon, as shown. Immediately following emergence of the pickup spool 112 from well 106, in response to the opening of front section 14 and the attendant pulling force exerted by draw tape 120, bar magnet 124 is brought to a position adjacent the metal strip 80 of pickup-tab 78. The flexible cloth of the pickup-tab is caused to move toward the spool surface by reason of the magnetic attraction of magnet 124 for metal strip 80, the cloth pickup-tab thereby commencing to be wound upon the spool. When spool 112 has rotated approximately one-half turn, the protruding prongs 126 penetrate and engage the cloth of pickup-tab 78, thus supplementing the holding force of the magnet for the metal strip. The metal strip 80 can be located either on the forward or rear surface of pickup-tab 78 to provide the required magnetic attraction of the bar magnet for the metal strip. Continued translational and rotational movement of spool 112 causes coiling of the covering layer area 76a of the film unit on the spool, the area 76a being sufficiently flexible for the coiling operation and being separated for the purpose from other portions 76b of the covering layer along the semi-perforations 76c. When front section 14 of the camera has been opened completely, spool 112 will have traveled to a location adjacent fluid container 84 and the covering layer area 76a will have been removed entirely from the photosensitive layer, thus placing the latter in a condition for the photographic exposure.

After the photographic exposure has been completed, front section 14 of the camera is closed and pickup spool 112 is thereby permitted to retrace its original path of travel and return to well 106, the carriage and spool being forced completely into the well by contact of portions of front section 14 with the spool just before the section is finally closed. In the performance of this operation, the tensioned torsion spring 114 provides the rotation of spool 112 which is necessary to bring about its translational movement, the uncoiling of covering layer portion 76a of the film unit from spool 112 and the simultaneous rotation of the pulleys 116, it having been stated that said pulleys and spool are integral and necessarily rotate together. Rotation of pulleys 116 provides coiling of the traction tapes 118 therearound, the latter operation serving to actuate the translational movement of carriage 108 and to draw the carriage in a direction toward well 106. An alternate construction would replace tracks 104 with a pair of racks and pulleys 116 with a pair of pinions. A blade-like depressor element 128 serves to complete the repositioning of the covering layer area 76a on photosensitive layer 74 during the aforesaid return movement of the carriage, thus placing the film unit in readiness for the processing operation. Approaching the limit of its return movement, the prongs 126 are withdrawn from the cloth pickup-tab 78. Maximum movement of carriage 108 in either of the above-described directions is controlled by limit stop means as, for example, by contact of depressor 128 with pulley 122 to limit its forward movement and contact of pulleys 116 with lugs 129 to limit its return movement. It will be understood that until the covering layer 76a has been returned to its superposed relation with photosensitive layer 74, the film unit cannot be removed from the camera.

Assuming the front film unit of the film pack to have been photographically exposed, the front section of the camera to have been closed following the exposure, and that the film unit is now to be processed to form a positive print, the draw-tab 24 of the film unit is manually grasped and pulled to withdraw the unit from the camera, the separable slots 90a of the film unit being caused by the applied pulling force to spread and permit release of detent pins 94 from apertures 90. As the film unit is drawn between pressure rolls 48 and 50, compression is progessively applied to the fluid container 84 of the film unit, the fluid, under said compression, causing separation of the container edges 84a. The processing fluid is released and spread between the layers 74 and 76 to provide processing of photosensitive layer 74 and formation of the positive image on surface of area 76a by diffusion transfer reversal.

The mechanical features of the film unit 22 and operations thereof which accompany the removal and processing of the film unit from the camera are further illustrated in detail in FIGS. 9 and 10. In FIGS. 9 and 10 only the relevant elements of the camera have been included. Two film units 22 and 22a of a film pack are shown, the top unit 22 representing that which is foremost in the camera and which has been exposed and is to be processed and removed. It is to be noted that the overturned ears 24c of the rear film unit 22a lie between the spaced layers 86 and 82 of the front film unit 22 in accordance with the aforesaid arrangement of the film pack. The underlying or rear film unit 22a is held against movement by the detent pins 94 while the front film unit is being removed. After the film unit 22 has been withdrawn a short distance, as shown in FIG. 9, the folded end 86a of sheet 86 of said film unit has been brought into contact with the overturned ears 24c of the draw-tab of film unit 22a which are inserted between layers 86 and 82 of film unit 22 and the draw-tab of film unit 22a is thus caused to move with the film unit 22 through contact of said elements 86a and 24c, as permitted by the slidable mounting of the crosspiece 24b between said layers 86 and 82. When, as shown in FIG. 10, the front film unit 22 has been withdrawn sufficiently to complete the spreading of the processing fluid between layers 74 and 76 thereof and is about to be finally removed from the camera, draw-tab portion 24a of film unit 22a has been carried by film unit 22 to a position such that it has been moved through the slot 86b of film unit 22a. At this juncture, the tapered trailing edges of the overturned ears 24c of film unit 22a have been caused to shear the overturned paper layer portion 86a of the film unit 22. Film unit 22 is thus freed from its attached relation with the remaining film units of the film pack, it being noted that film unit 22a is still held stationary by the detent pins 94. Layer portion 86a of film unit 22 is designed to tear free before the slots 90a of film unit 22a separate and release the detent pins 94. Film unit 22a is thus invariably retained in the camera during removal of film unit 22.

Figure 11:
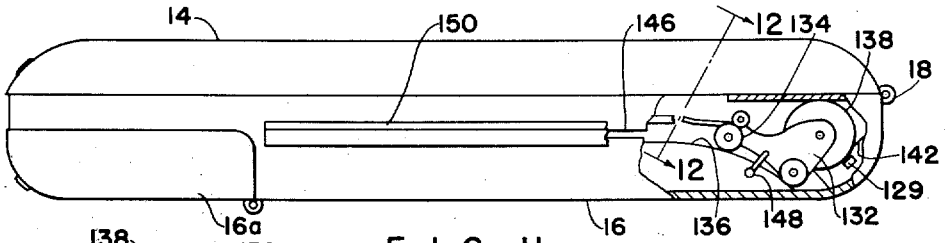
FIG. 11 is a diagrammatic view, partly in section and with parts broken away, of a modification of the camera of FIGS. 1, 6, 7 and 8.
Figure 12:
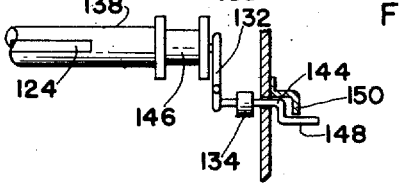
FIG. 12 is a diagrammatic view, partly in section taken along the line 12—12 of FIG. 11.

FIGS. 11 and 12 show alternate apparatus for removing and replacing the covering layer 76 of the film unit comprising a carriage 132 having guide rollers 134 riding in tracks 136, a pickup spool 138 having an internal torsion spring (not shown), and pulleys 140 for traction tapes 142, said elements being generally similar to those previously described. The carriage carrying the pickup spool is actuated in its translational movement by an arm 144 extending through a longitudinal slot 146 formed in the rear section 16 of the camera housing. An actuating handle 148 is mounted on the end of arm 144 and is adapted to be moved manually back and forth to remove the covering layer 76 preparatory to the photographic exposure and then to replace said layer. A light-shielding flange or canopy 150, having light-sealing strips of a piled fabric or the like (not shown), is provided adjacent the slot 146. The foregoing modification would obviate the need for closing the camera after each exposure to process and remove a film unit. It would also be adapted to incorporation with a camera which does not have a movable front.

It is to be understood that the opening of the front section of the camera need not be limited to that which provides its extending at the acute angle shown with respect to the rear section, said angle being more a matter of convenience than of necessity. In the modified camera of FIGS. 11 and 12, for example, it will be apparent that no need for limiting the opening of the front section of the camera to an acute angle exists at all. Furthermore, with respect to the camera to which FIGS. 1 through 10 relate and in which the actuating means, i.e., the draw-tape 120, is attached to the front section and moves therewith, it would be possible to rearrange the elements or to provide revised means wherein the front section could be extended at 90° to the rear section, in conjunction with a self-erecting front which mounts the objective, and still serve to provide the required translational movement of the carriage and pickup roll.

The means for mounting the takeup spool 112 for translational movement has been described as a carriage and this constitutes a preferred construction. It will be apparent, however, that the carriage could be omitted and that a central shaft or hub of the spool and integral traction tape pulleys 116 could be mounted either directly or through the medium of suitable bearing means in the tracks 136. In such an event some modification of the depressor element 128 and mounting of a torsion spring would, of course, be required.

Although the means for removing each film unit of a film pack following the first unit has been described as a draw-tab which is brought to a location outside of the camera through movement of the preceding film unit, alternate means for progressively removing the film units could be provided. A device for such a purpose could advantageously constitute an ejecting mechanism which would move the front film unit at least the short distance necessary to provide a portion outside of the camera which could be manually grasped, thus eliminating the necessity for a draw-tab of the type shown. Such a device might, for example, constitute a pair of finger elements (not shown) located at each longitudinal side of the planar area at which the film is positioned for exposure, said finger elements being adapted to engage and move the front film unit by a required amount. Engagement of the fingers with the film unit could appropriately occur by inserting the fingers between the covering layer portion 76a and the photosensitive layer 74 at approximately the point where said portion 76a joins the unseparated portions of layer 76 adjacent to the fluid container 84. The engaging fingers could be biased for translational movement as, for example, by compression spring means, so that when released for said movement they would carry the film unit toward aperture 54. Tensioning of the compression spring could be accomplished in any suitable manner as, for example, by a mechanism connected with and actuated by opening of the front camera section. Closing of the front section would release or trigger the finger elements carrying the front film unit to the required position. Means providing an interlock between the shutter release of the camera and the aforesaid trigger means would insure that the film unit could be moved only after the shutter had been actuated to make the photographic exposure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for use with a film material which includes a photosensitive layer and a covering element for said photosensitive layer which is opaque to light actinic relative to said photosensitive layer and [having] *has* a flexible partially removable portion which is adapted to be coiled away from a fixed portion to expose said photosensitive layer, said apparatus comprising housing means providing a chamber for photographically exposing said film [unit] *material,* means for mounting said film [unit] *material* in a given image plane in said chamber, rotatable coiling means initially positioned for engaging an extremity of said flexible covering [layer] *element* portion, means for simultaneously rotating and translationally moving said coiling means in a plane spaced from and substantially parallel with said image plane, the aforesaid movement of the coiling means serving to provide its firm engagement with said covering [layer] *element* extremity and to coil thereon said flexible covering [layer] *element* portion so as to uncover an image area of said photosensitive layer to enable its photographic exposure, and means for returning said rotatable coiling means to its initial position to uncoil said covering element portion and replace it on said photosensitive layer.

2. Photographic apparatus for use with a film unit which includes a base, a photosensitive layer superimposed on said base, and a covering layer superimposed on said photosensitive layer and having a flexible partially removable portion which is operated upon to expose said photosensitive layer, said base and covering layer being opaque to light which is actinic relative to said photosensitive layer, said apparatus comprising housing means providing a chamber for photographically exposing said film unit, means for so mounting said film unit in said chamber as to establish said unit in an image plane, carriage means located, when idle, at one side of said planar area and adapted to be moved translationally across said planar area in spaced relation thereto, means for translationally moving said carriage means and for guiding its translational movement in a plane substantially parallel with that of said planar area, takeup means rotatably mounted on said carriage for translational movement therewith and adapted to engage an extremity of said flexible covering layer portion, means for rotating said takeup means simultaneously with its translational movement to coil thereon said flexible covering layer portion and thereby to uncover an image area of said photosensitive layer to enable its photographic exposure, and means for returning said carriage and takeup means to said idle location after said exposure to uncoil said covering layer portion and replace it on said photosensitive layer.

3. Photographic apparatus as defined in claim 2 wherein said chamber is adapted to receive a plurality of said film units in the form of a film pack.

4. Photographic apparatus as defined in claim 2 wherein said means for returning said carriage and takeup means comprises a torsion spring mounted within said takeup means.

5. Photographic apparatus as defined in claim 2 wherein said means for returning said carriage and takeup means comprises a torsion spring mounted in said takeup means, a pair of takeup pulleys integral with said takeup means, and a pair of traction tapes fastened, respectively, to said pulleys and said housing means.

6. Photographic apparatus as defined in claim 5 wherein said pulleys and traction tapes serve to maintain proper position of said takeup means transversely of said film unit.

7. Photographic apparatus as defined in claim 2 wherein said takeup means is a rotatable spool having a bar magnet mounted on its surface for magnetically attracting a metallic strip located at an extremity of said flexible covering layer portion.

8. Photographic apparatus as defined in claim 7 wherein said rotatable takeup spool also comprises a plurality of needle-like prongs extending from its surface for further engaging said flexible covering layer portion.

9. Photographic apparatus as defined in claim 2 wherein said carriage means includes a depressor element for bearing upon the external surface of said partially removable covering layer portion during the return movement of said carriage and takeup means for properly replacing said portion on said photosensitive layer.

10. Photographic apparatus as defined in claim 2 wherein said means for guiding said carriage means comprises a pair of tracks mounted longitudinally of said housing in which guide elements of said carriage are adapted to travel.

11. Photographic apparatus as defined in claim 10 wherein said carriage guide elements are a plurality of guide rollers adapted to travel within said tracks.

12. Photographic apparatus for use in producing a photographic print by a diffusion transfer reversal method of image formation, said apparatus comprising housing means providing a chamber for photographically exposing a film unit which includes a base, a photosensitive layer superimposed on said base, and a covering layer having a flexible partially removable portion superimposed on said photosensitive layer which is removed from its covering position to expose said photosensitive layer, said base and covering layer being opaque to light which is actinic relative to said photosensitive layer, means for mounting said film unit in a given planar area of said exposure chamber, means located adjacent to said planar area for applying a processing fluid to at least said photosensitive layer, carriage means located, when idle, to one side of said planar area and adapted to be moved translationally across said planar area in spaced relation thereto, means for translationally moving said carriage means and for guiding its translational movement in a plane substantially parallel with that of said planar area, takeup means rotatably mounted on said carriage for translational movement therewith and adapted to engage an extremity of said covering layer portion, means for rotating said takeup means simultaneously with its translational movement to wind thereon said flexible covering layer portion and thereby to uncover an image area of said photosensitive layer to enable its photographic exposure, and means for returning said carriage and takeup means to said idle location after said exposure to unwind said covering layer portion and replace it on said photosensitive layer.

13. Photographic apparatus as defined in claim 12 wherein said means for applying a processing fluid comprises a compressible fluid container having a releasably sealed orifice positioned between said base and covering layer at the side of an image area of said photosensitive layer, and compression-applying means between which said film unit is adapted to be drawn.

14. Photographic apparatus as defined in claim 13 wherein said compression-applying means consists of a pair of pressure rolls of given compressive characteristics mounted in said housing means.

15. Camera apparatus for use with a film unit which includes a base, a photosensitive layer superimposed on said base, and a covering layer having a flexible partially removable portion in superimposed relation with said photosensitive layer, said portion being actuated to expose said photosensitive layer, said base and covering layer being opaque to light which is actinic with respect to said photosensitive layer, said camera apparatus comprising housing means including a front section mounting an objective lens, a rear section, means pivotally connecting said front and rear sections at an extremity of each, latching means provided at extremities of said sections opposite to said pivotally connected extremities, an aperture having light-sealing means formed in an extremity of said rear section adjacent said latching means for permitting movement of said film unit therethrough, and a bellows interconnecting said sections, said sections and bellows providing a chamber for photographically exposing said film unit and said rear section comprising means for mounting said film unit in a given planar area, carriage means located, when idle, to one side of said planar area and adapted to be moved translationally across said planar area in spaced relation thereto, means for guiding the translational movement of said carriage in a plane substantially parallel with that of said planar area, takeup spool means rotatably mounted on said carriage for translational movement therewith and adapted to engage an extremity of said flexible covering layer portion, means for translationally moving said carriage and spool means, means for rotating said spool means simultaneously with its translational movement to take up thereon said flexible covering layer portion and thereby to uncover an image area of said photosensitive layer to enable its photographic exposure, and means for returning said carriage and spool means to said idle location after said exposure to release said covering layer portion from said spool and replace it on said photosensitive layer.

16. Camera apparatus as defined in claim 15 wherein said means for translationally moving said takeup spool in a direction for removing said portion of the covering layer comprises said front section and a draw tape interconnecting said takeup spool and said front section.

17. Camera apparatus as defined in claim 16 wherein said rear section comprises a pivotally mounted subsection which is adapted to be opened for loading a plurality of said film units into said camera in the form of a film pack.

18. Camera apparatus as defined in claim 16 wherein limit stop means are provided for limiting the relative pivotal movement of said front section substantially to 45°.

19. Camera apparatus as defined in claim 17 wherein a plurality of flexible ramps, a spring-biased pressure plate and fixed positioning means are provided for loading and positioning in said camera a plurality of said film units in the form of a film pack.

20. Camera apparatus as defined in claim 15 wherein said rear section is adapted to carry a plurality of said film units in the form of a film pack and wherein means are provided to maintain unexposed film units within said camera while a front exposed film unit is undergoing withdrawal from the camera, the last-mentioned means comprising detent means releasably engaging said front film unit adjacent an extremity thereof and permitting release of said front film unit while engaging succeeding film units adjacent their extremities and holding them fixed against movement, said film units having separable perforations cooperating with said detent means for the purpose.

21. Camera apparatus as defined in claim 17 wherein each film unit comprises a draw-tab, the draw-tab of the first or front film unit projecting slightly from the camera [between] *through* said aperture when the film pack is loaded, and draw-tabs of succeeding film units being thus positioned upon the withdrawal of a film unit from the camera after its exposure.

*22. Photographic apparatus for use with a film material which includes a photosensitive layer and a covering element for said photosensitive layer which is opaque to light actinic relative to said photosensitive layer and at least in part flexible and adapted to be coiled away from said photosensitive layer to expose said layer and then to be uncoiled and returned to its covering position, said apparatus comprising housing means providing a chamber for photographically exposing said film material, means for mounting said film material in a given image plane in said chamber, rotatable coiling and uncoiling means initially positioned for engaging an extremity of said covering element, means for simultaneously rotating and translationally moving said coiling and uncoiling means in a plane spaced from and substantially parallel with said image plane, the aforesaid movement of the coiling and uncoiling means serving to provide its firm engagement with said covering element extremity to coil thereon said covering element so as to uncover an image area of said photosensitive layer and enable its photographic exposure and, after said exposure, to uncoil said covering element and replace it on said photosensitive layer while returning said coiling and uncoiling means to its original position.*

*23. Photographic apparatus, as defined in claim 22, wherein said means for rotating and translationally moving said coiling and uncoiling means is manually operable.*

*24. Photographic apparatus, as defined in claim 22, said apparatus being in the form of a camera having a front which opens, wherein said means for rotating and translationally moving said coiling and uncoiling means is responsive to the opening and closing of said front.*

*25. Camera apparatus for use with a film unit mounted therein which includes a photosensitive layer and a covering element for said photosensitive layer which is opaque to light actinic relative to said photosensitive layer and at least in part flexible and adapted to be coiled away from said photosensitive layer to expose said layer and then to be uncoiled and returned to its covering position, said apparatus comprising housing means providing a chamber for photographically exposing said film unit, means for mounting said film unit in a given plane in said chamber for photographic exposure, and takeup means for coiling said covering element substantially completely thereupon while said film unit is mounted fixedly in said plane to uncover an image area of said photosensitive layer and enable its photographic exposure and, after said exposure, for uncoiling said covering element, to replace it so as to again cover said image area of the photosensitive layer.*

*26. Camera apparatus, as defined in claim 25, wherein said camera has a front which opens and said coiling and uncoiling takeup means is mechanically connected therewith and responsive to the opening and closing thereof.*

*27. Camera apparatus, as defined in claim 25, wherein said coiling and uncoiling takeup means is manually operable.*

*28. Photographic apparatus for use with a film material which includes a photosensitive layer and a covering element for said photosensitive layer which is opaque to light actinic relative to said photosensitive layer and has a flexible partially removable portion which is adapted to be coiled away from a fixed portion to expose said photosensitive layer and then uncoiled and returned to said fixed portion, said apparatus comprising housing means providing a chamber for photographically exposing*

*said film material, means for mounting said film material in a given image plane in said chamber, rotatable coiling and uncoiling means initially positioned for engaging an extremity of said flexible covering element portion, means for simultaneously rotating and translationally moving said coiling and uncoiling means in a plane spaced from and substantially parallel with said image plane, the aforesaid movement of the coiling and uncoiling means serving to provide its firm engagement with said covering element extremity to coil thereon said flexible covering element portion so as to uncover an image area of said photosensitive layer and enable its photographic exposure and, after said exposure, to uncoil said covering element portion and replace it on said photosensitive layer while returning said coiling and uncoiling means to its original position.*

*29. Photographic apparatus, as defined in claim 22,*

*wherein said means for rotating and translationally moving said coiling and uncoiling means comprises an arm attached thereto and extending through a slot of said housing means, said arm being adapted to be manually actuated.*

*30. Photographic apparatus, as defined in claim 28, said apparatus being in the form of a camera having a front which opens and wherein said coiling and uncoiling means is responsive to the opening and closing thereof.*

References Cited in the file of this patent or the original patent

UNITED STATES PATENTS

| | | |
|---|---|---|
| 785,239 | Thornton | Mar. 21, 1905 |
| 2,447,468 | Reyniers | Aug. 17, 1948 |